(12) United States Patent
Siu et al.

(10) Patent No.: US 11,803,250 B2
(45) Date of Patent: Oct. 31, 2023

(54) METHOD AND APPARATUS FOR RECOGNIZING USER TO PROVIDE PERSONALIZED GUIDE, CONTENT AND SERVICES, AND TARGETED ADVERTISEMENT WITHOUT INTENTIONAL USER REGISTRATION

(71) Applicant: HOME CONTROL SINGAPORE PTE LTD, Singapore (SG)

(72) Inventors: Kwok Hoong Siu, Singapore (SG); Kyaw Zayar Han, Singapore (SG); Ching Guan Tay, Singapore (SG); Chen Wee Cheah, Singapore (SG)

(73) Assignee: HOME CONTROL SINGAPORE PTE LTD, Singapore (SG)

( * ) Notice: Subject to any disclaimer, the term of this patent is extended or adjusted under 35 U.S.C. 154(b) by 312 days.

(21) Appl. No.: 16/642,800

(22) PCT Filed: Aug. 28, 2018

(86) PCT No.: PCT/SG2018/050432
§ 371 (c)(1),
(2) Date: Feb. 27, 2020

(87) PCT Pub. No.: WO2019/045644
PCT Pub. Date: Mar. 7, 2019

(65) Prior Publication Data
US 2020/0257877 A1 Aug. 13, 2020

(30) Foreign Application Priority Data
Aug. 29, 2017 (WO) ................ PCT/SG2017/050426

(51) Int. Cl.
G06F 3/02 (2006.01)
H04N 21/4415 (2011.01)
(Continued)

(52) U.S. Cl.
CPC .......... *G06F 3/021* (2013.01); *G06V 40/1335* (2022.01); *G06V 40/1353* (2022.01);
(Continued)

(58) Field of Classification Search
CPC ....... H04N 21/41265; H04N 21/42224; H04N 21/42222; H04N 21/4126; H04N 21/4532;
(Continued)

(56) References Cited

U.S. PATENT DOCUMENTS

| 11,402,971 B1* | 8/2022 | McNamara ......... G06V 40/103 |
| 2003/0028872 A1 | 2/2003 | Milovanovic |

(Continued)

FOREIGN PATENT DOCUMENTS

| CN | 102907114 A | 1/2013 |
| CN | 102984588 A | 3/2013 |

(Continued)

OTHER PUBLICATIONS

International Search Report and Written Opinion issued in corresponding International Application No. PCT/SG2017/050426 dated Nov. 2, 2017.

(Continued)

Primary Examiner — Chenea Davis
(74) Attorney, Agent, or Firm — Foley & Lardner LLP

(57) ABSTRACT

A method and an apparatus for recognizing different users in a household without having the users to register or enroll their biometric features are provided. The apparatus may leverage sensors integrated with a remote control device or connected to a media device and create pseudo-identity of a user when the user is consuming the content services from media device. When pseudo-identity is created, user's content preference, user's viewing habit, and user's viewing behavior with respect to the content, may be associated with (Continued)

more than one pseudo-identity to better identify the same user. In subsequent usage, personalized services, such as personalized guide & programs, user-selected preferences, targeted advertisement, or content recommendation, may be provided by service provider to user in a subtle and natural manner.

16 Claims, 14 Drawing Sheets

(51) Int. Cl.
H04N 21/45 (2011.01)
H04N 21/81 (2011.01)
H04N 21/475 (2011.01)
G06V 40/50 (2022.01)
G06V 40/12 (2022.01)
H04N 21/41 (2011.01)

(52) U.S. Cl.
CPC .......... *G06V 40/1371* (2022.01); *G06V 40/50* (2022.01); *H04N 21/41265* (2020.08); *H04N 21/4415* (2013.01); *H04N 21/4532* (2013.01); *H04N 21/4753* (2013.01); *H04N 21/812* (2013.01)

(58) Field of Classification Search
CPC .............. H04N 21/4415; H04N 21/812; H04N 21/4753; G06F 21/32; G06F 3/021; G06F 3/0234; G06V 40/1371; G06V 40/13; G06V 40/1353; G06V 40/1335; G06V 40/50
See application file for complete search history.

(56) References Cited

U.S. PATENT DOCUMENTS

| | | | |
|---|---|---|---|
| 2006/0008129 A1 | 1/2006 | Lee et al. | |
| 2006/0080525 A1 | 4/2006 | Ritter et al. | |
| 2007/0079137 A1 | 4/2007 | Tu | |
| 2007/0094208 A1 | 4/2007 | Cerrato | |
| 2010/0283916 A1 | 11/2010 | Yen et al. | |
| 2010/0332565 A1 | 12/2010 | Al-Shaykh et al. | |
| 2011/0158486 A1 | 6/2011 | Bringer et al. | |
| 2012/0268241 A1 | 10/2012 | Hanna et al. | |
| 2012/0291111 A1 | 11/2012 | Kamakura | |
| 2013/0138652 A1* | 5/2013 | Bigdeli .................. | G06V 40/70 707/758 |
| 2013/0272586 A1 | 10/2013 | Russo | |
| 2014/0003717 A1 | 1/2014 | Brito et al. | |
| 2014/0314283 A1* | 10/2014 | Harding ................. | G06V 40/70 382/115 |
| 2015/0143394 A1 | 5/2015 | Hijikata et al. | |
| 2016/0087957 A1 | 3/2016 | Shah et al. | |
| 2016/0247013 A1 | 8/2016 | Johansson | |
| 2017/0192465 A1 | 7/2017 | Lazaridis et al. | |
| 2017/0200039 A1 | 7/2017 | Wright et al. | |
| 2017/0332031 A1 | 11/2017 | Park | |
| 2018/0068399 A1 | 3/2018 | Feinberg et al. | |
| 2019/0026453 A1 | 1/2019 | Choi et al. | |

FOREIGN PATENT DOCUMENTS

| | | |
|---|---|---|
| CN | 103369391 A | 10/2013 |
| CN | 103559487 A | 2/2014 |
| CN | 105959749 A | 9/2016 |
| CN | 105959762 A | 9/2016 |
| CN | 106030599 A | 10/2016 |
| CN | 106257926 A | 12/2016 |
| CN | 106650569 A | 5/2017 |
| CN | 106911963 A | 6/2017 |
| CN | 108053844 A | 5/2018 |
| CN | 1322439 A | 11/2021 |
| DE | 10117765 A1 | 10/2002 |
| EP | 2 579 608 A1 | 4/2013 |
| JP | 2000-163572 A | 6/2000 |
| JP | 2001-128253 A | 5/2001 |
| JP | 2008-193258 A | 8/2008 |
| JP | 2010-087596 A | 4/2010 |
| JP | 2011-223573 A | 11/2011 |
| JP | 2013-505674 A | 2/2013 |
| KR | 20120045847 A | 5/2012 |
| KR | 10-2015-0034832 A | 4/2015 |
| KR | 20160004363 A | 1/2016 |
| KR | 10-2017-0042291 A | 4/2017 |
| TW | 201421397 A | 6/2014 |
| TW | 201546645 A | 12/2015 |
| WO | WO 01/24524 A1 | 4/2001 |
| WO | WO-2011/037761 A1 | 3/2011 |
| WO | WO 2017/096767 A1 | 6/2017 |
| WO | WO-2017/113380 A1 | 7/2017 |

OTHER PUBLICATIONS

International Preliminary Report on Patentability issued in corresponding International Application No. PCT/SB2017/050426, dated Jun. 6, 2019.
U.S. Office Action issued in U.S. Appl. No. 16/638,130, dated Dec. 28, 2020.
Office Action issued in co-pending U.S. Appl. No. 16/638,130, dated Dec. 22, 2021.
Office Action issued in Japanese patent application No. 2020-512590 dated Jun. 22, 2021.
Office Action issued in Korean Patent Application No. 10-2020-7009154 dated Jul. 19, 2021.
Written Opinion issued in Korean Patent Application No. 10-2020-7009154 dated Sep. 16, 2021.
Office Action issued in co-pending U.S. Appl. No. 16/638,130, dated Jul. 27, 2021.
International Search Report and Written Opinion issued in International Patent Application No. PCT/SG0218/050432, dated Oct. 31, 2018.
Final Office Action on U.S. Appl. No. 16/638,130 dated Oct. 5, 2022.
Official Action issued in European Patent Application No. 17768263.0, dated Dec. 19, 2022.
Office Action issued in Chinese Patent Application No. 201780094526.2, dated Jan. 20, 2023.
Office Action and Search Report issued in Taiwan Patent Application No. 107130146, dated Feb. 20, 2023.
Office Action issued in China Patent Application No. 201880056232.5, dated Jan. 30, 2023.
Request for the Submission of an Opinion issued in co-pending Korea Patent Application No. 10-2020-7009233, dated Nov. 8, 2022, 10 pages.
Non-Final Rejection issued in Taiwan Patent Application No. 107129479, dated Mar. 4, 2022.
Non-Final Rejection issued in Taiwan Patent Application No. 107130146, dated Apr. 15, 2022.
Examination Report issued in co-pending India Patent Application No. 202017013652, dated Mar. 14, 2022.

* cited by examiner

METHOD AND APPARATUS FOR RECOGNIZING USER TO PROVIDE PERSONALIZED GUIDE, CONTENT AND SERVICES, AND TARGETED ADVERTISEMENT WITHOUT INTENTIONAL USER REGISTRATION

CROSS-REFERENCE TO RELATED APPLICATION(S)

This application claims the benefit of International Patent Application No. PCT/SG2017/050426, entitled "Subtle User Recognition" and filed on Aug. 29, 2017, which is expressly incorporated by reference herein in its entirety.

TECHNICAL FIELD

Various aspects of this disclosure generally relate to human-computer interaction, and more particularly, to user recognition without intentional user registration.

BACKGROUND

With more and more content available in the World Wide Web and media devices (e.g. personal computing devices, media streaming devices, Over-the-top (OTT) boxes, cable set top boxes (STB), satellite television receivers, smart television, digital video recorders, game consoles), the volume of infotainment content can easily overwhelm viewers wishing to locate items of interest. Traditionally, tools, such as television (TV) guides and searching functionality, list channels sequentially, one by one in increasing numerical order. In other words, channels and TV content are organized in standard way without regard to a specific user. It is also not uncommon, that the types of content programming are geared toward, and to attract, specific groups of viewers. For example, there may be several channels strictly devoted to news, and several other channels devoted to nothing but sport. As the number of channels and TV programs continue to grow, viewers are spending increasing amount of time in browsing TV guides to find content that match their interests. What is needed, therefore, is a way to customize the delivery and presentation of content that is suited to unique interests of a particular viewer.

Broad characterization and categorization techniques deployed by service providers, such as census statistics, polling, and surveys, tend to lump large numbers of households together in broadly defined geographical areas.

Customers (or users) of a service provider may subscribe to various packages, where each package provides access to a certain set of channels, by calling service provider to establish an account. While setting up an account, a customer may also provide name, gender, date of birth, marital status, home address, credit card number, billing information, and employment information. Service provider may use this information as customer's identification data and subsequently using part of the information such as name and address to create a household identifier, to be sent to data service providers and/or third-party providers for commercial purposes like advertisement and analytic reports. Service provider may analyze the view history, search history, purchase history, and the like, from the media device such as STB and OTT box corresponding to the household identifier to provide a customized program guide. However, service provider is unable to identify individual members in the viewing audience/household and thus cannot deliver personalized services such as personalized guide & programs, user-selected preferences, targeted advertisement, or content recommendation.

Personalization techniques are developing to "understand" a user's need for specific types of infotainment. Any recommendation service provided will need to have information known about the user.

A user may personalize the media device in a variety of ways. A user may record and store TV programs, create personalized music playlists, unique channel/content line-ups, other settings, or individual viewing guide. Oftentimes, this requires entry of a password or passcode during user profile setup and re-entry of password or passcode for user authentication or identification to access his/her personalized settings later. This is conventionally done via manual input, e.g. key presses on TV remote control, keyboard entry on a tablet or personal computer. This may include multiple steps in navigating to menus to enter password or passcode. This encumbers the user experience. In addition, more often than not, user may forget the password or passcode.

Alongside with password or passcode, it is common practice to include the use of biometric identification to verify the identity of a person by digitally measuring selected features of some physical characteristic and comparing these with those filed for the person in a reference database. Biometric information associated with a particular user may be a retina scan, a voice signature, a facial signature, a fingerprint scan, etc.

A user may be granted administrator's right to create and manage different profiles for each family member in a household. User identification information may be set up for new user using biometric information based on facial features. The administrator may have new user Randall standing before an input device that will input information about Randall's facial features, as part of setting up user profile. This intentional step is also known as enrolment or registration.

Another method of using biometric identification is using fingerprint scanner to identify identification information of user when STB is turned on. The STB may request the (new) user to put a finger on the fingerprint scanner included in the remote control to scan a fingerprint, and to input personal information, such as name, age, gender, and the like, and view authority setting. The STB may then store the identification information including the personal information, the view authority, and the personal identifier together with the fingerprint scan data in the storage unit to register/enroll the fingerprint of the (new) user. The service provider's server may then transmit a personalized program guide to the user associated with the identification information.

The methods described above require a user to knowingly "register" him/herself, typically through registration, either before using the system or when the system fails to recognize the user. This "hard-selling" tactic may not suit every user, unless user sees the benefits in doing so. A user also gets frustrated having to repeat registration for multiple times when the system fails to register due to poor fingerprint/facial features capturing. In most systems, if not all, system requires a user to continue registration/enrolment until successful before the user can move on to next activity.

What is desirable, therefore, is a natural and subtle way—without intentional steps of enrolment or registration—to identify a user by learning user's viewing habits, viewing behaviors, and knowing types of program the user has interest in, such as view history, search history, purchase history, preferred channel—when user is accessing content and services; and having service provider's server to personalize program guide, send targeted advertisement and recommend content and services that the user likes.

Besides some users may find enrolment or registration for their biometric information cumbersome, some users may be wary about providing identification information (e.g., name and age) during registration. Unfortunately, in traditional systems, a user may have to agree to transmit his/her personal information otherwise will not be able to receive service such as personalized advertisement or personalized program guide.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

This disclosure describes method and apparatus for recognizing different users in a household without having the users to register or enroll their biometric features by leveraging sensors integrated with a remote control device or connected to a media device and creating pseudo-identity of a user when the user is consuming the content services from media device. When pseudo-identity is created, user's content preference, user's viewing habit, and user's viewing behavior with respect to the content, may be associated with more than one pseudo-identity to better identify the same user. In subsequent usage, personalized services, such as personalized guide & programs, user-selected preferences, targeted advertisement, or content recommendation, may be provided by service provider to user in a subtle and natural manner. With pseudo-identity associated with user gets transmitted, user may not need to provide personal identification information, thus may inhibit the ability of malicious parties from causing physical, economic, and emotional harm to the individual.

In an aspect of the disclosure, a method, a computer readable medium, and an apparatus for user recognition are provided. The apparatus may capture biometric information of a user using a set of biometric sensors. The apparatus may convert the biometric information of the user into a biometric dataset of the user. The apparatus may determine whether the biometric dataset matches any existing temporary pseudo-identity. The apparatus may create a temporary pseudo-identity of the user to be associated with the biometric dataset when the biometric dataset does not match any existing temporary pseudo-identity. The apparatus may determine whether the temporary pseudo-identity satisfies a set of pseudo-identity criteria. The apparatus may convert the temporary pseudo-identity of the user into a pseudo-identity of the user when the temporary pseudo-identity satisfies the set of pseudo-identity criteria.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1C:
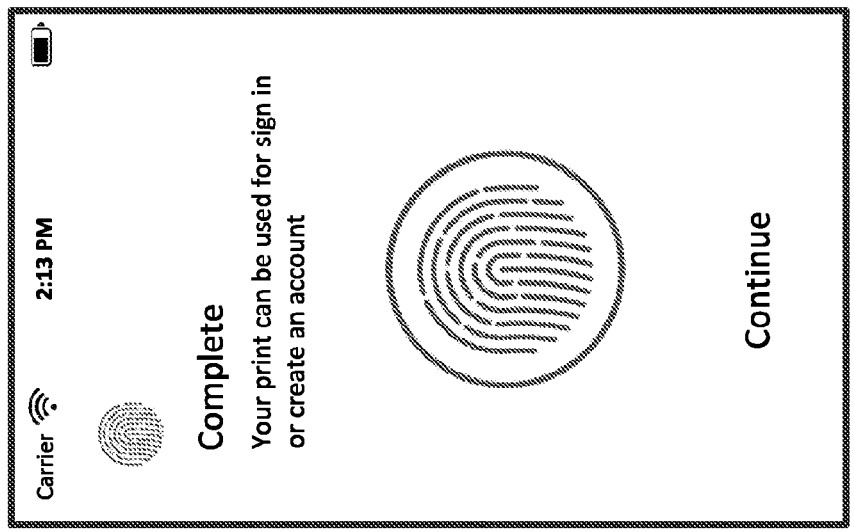
FIGS. 1A, 1B, 1C show an example of registration of fingerprint.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of user recognition will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In one aspect of the disclosure, sensor technology may be leveraged to recognize different users in a household without having the user to register or enroll his/her biometric features. Biometric information associated with a particular user may be a retina scan, a voice signature, a facial signature, a fingerprint scan. Biometric sensor technology may be fingerprint sensor incorporated into a remote control, a camera mounted on the TV, or a microphone embedded in the remote control.

In some embodiments, a system and method of achieving user recognition without needing the user to perform an intentional step are provided. Biometric information may be captured using a fingerprint sensor on a handheld device, e.g., a remote controller unit. A pseudo-identity of the user may be determined based on the fingerprint frames. A viewing profile associated with the pseudo-identity of the user may be generated or modified based on content consumed by the user in a time period.

In some embodiments, a user may be identified by leveraging sensors integrated with a remote control device or connected to a media device and creating pseudo-identity of the user when the user is consuming the content and services from media device. When pseudo-identity is created, the user's content preference (e.g. view history, search history, purchase history, preferred channel, types of program interested in, etc.), the user's viewing habit (e.g., particular time of day, number of hours, resolution preference, volume level, etc.), and the user's viewing behavior with respect to the content (e.g., fast-forward through portions, rewind, or pause portions, etc.) are associated with more than one pseudo-identity to better identify the same user. In subsequent usage, personalized services, such as personalized guide and programs, user-selected preferences, targeted advertisement, or content and services recommendation, may be provided by service provider to user in a subtle and natural manner, without user even need to enroll or register him/herself beforehand. With pseudo-identity associated with user gets transmitted, user may not need to provide personal identification information, thus may inhibit the ability of malicious parties from causing physical, economic, and emotional harm to the individual.

The embodiments of the disclosure relate particularly to fingerprints. The term fingerprint is intended to mean a print (a graphical representation of ridges and valleys) of a finger (including the thumb). However, it will be understood that the method is not limited to fingerprints but is applicable to any print that can be represented by a set of minutiae points, for example, prints from fingers, palms, toes and soles. In some embodiments, minutiae is the unique, measurable physical point at which a ridge bifurcates or ends.

While many embodiments described in the disclosure relate to fingerprint biometric, it will be appreciated that the method and procedure for creating pseudo-identity of a user, associating user's preferred content services, such as types of program interested in, user's viewing habit and viewing behavior with respect to the content, to allow personalized services to be provided in a subtle and natural manner, without user even needs to enroll or register him/herself beforehand, are applicable to other biometric sensors that require enrolment/registration in the traditional applications, for example facial or iris recognition sensor, microphone for voice signature, contact or grip sensors (e.g. capacitive, mechanical or pressure sensors) that distinguish user holding styles or optical sensors located on peripheral edges of device to ascertain vein pattern data.

Traditional fingerprint verification may comprise two distinct stages, registration and matching. Fingerprint verification may be initialized with registration, during which multiple fingerprint images are captured sequentially in the order defined by the system, e.g., a graphical fingerprint on screen with animations/highlights and instructions to user to continue pressing fingerprint sensor in defined order, typically an overlapping manner and different orientation angles. The screen may be on a handheld device like a smartphone or a TV screen or any display device to provide visual que to user. The reference fingerprint template is formed by taking the union of the minutiae of all the minutia representations during registration to compose the acceptable template. The registration process is then successfully terminated. User, if chooses to, may register more than one finger or the same finger more than once to form one or more reference fingerprint templates. Matching of a fingerprint involves taking an input fingerprint scan after registration and comparing to one or more reference fingerprint templates.

Figure 1B:
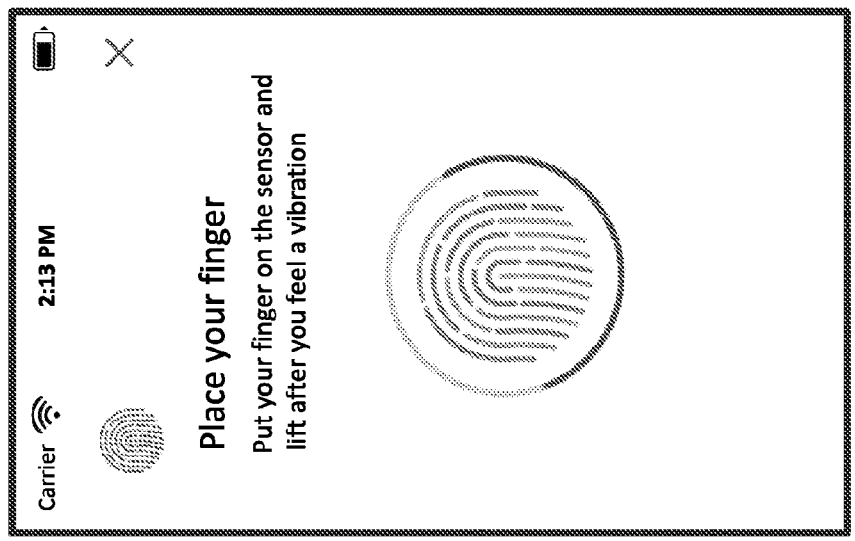
Figure 1A:
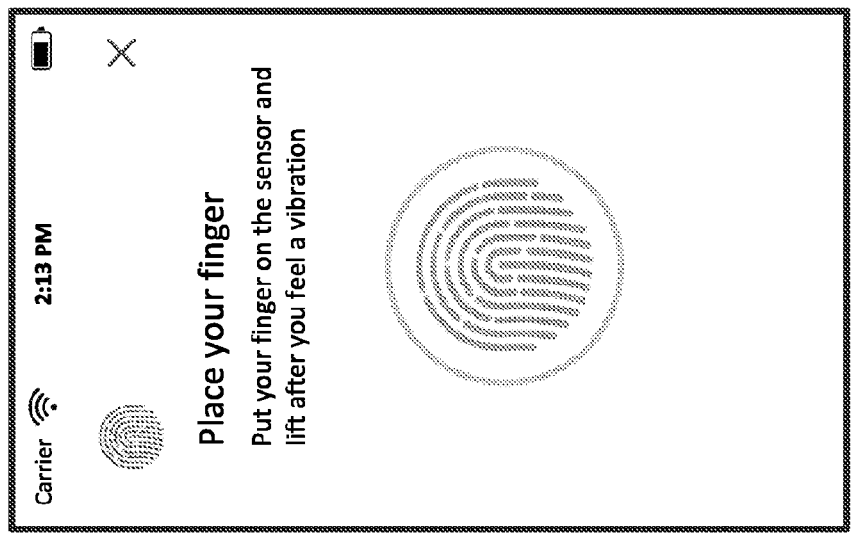

FIGS. 1A, 1B, 1C show an example of registration of fingerprint. As shown in FIG. 1A, user is prompted to put his/her finger on the fingerprint sensor. After the fingerprint image is obtained, feature extraction is performed, for example minutiae extraction. The amount of information extracted towards forming a complete template is animated with partial complete fingerprint image with different color lines to show user of the progress, as shown in FIG. 1B. User must continue registration by placing and lifting finger from sensor repeatedly at different angle or orientation for the system to complete a template, at which time the system may present a notification, as shown in FIG. 1C. The template is used later to compare with fingerprint scan to verify the identity of the user before the system can provide customized services e.g. personalized programs and guide. Many systems attempt to reconstruct a fingerprint template from a sequence of images generated by small sensor, e.g. touch sensor or swipe sensor. Small sensor is common due to fingerprint biometrics industry has been dropping sensor cost through reducing sensor size. Many minutiae-based methods of combining fingerprints rely on the predetermined minutiae features or image overlapping to register at least a predetermined minimum width of fingerprint to form templates. During registration, the user may be prompted to place and lift finger repeatedly until a set of images with required minutiae features or overlap are received. During registration, user is unable to move to next stage unless the whole registration is completed. If user quits the registration prematurely, user must restart the whole registration if user intends to use a certain application (e.g. receiving personalized programs and guide) which requires registration since his/her fingerprint information is not in the database.

Figure 2:
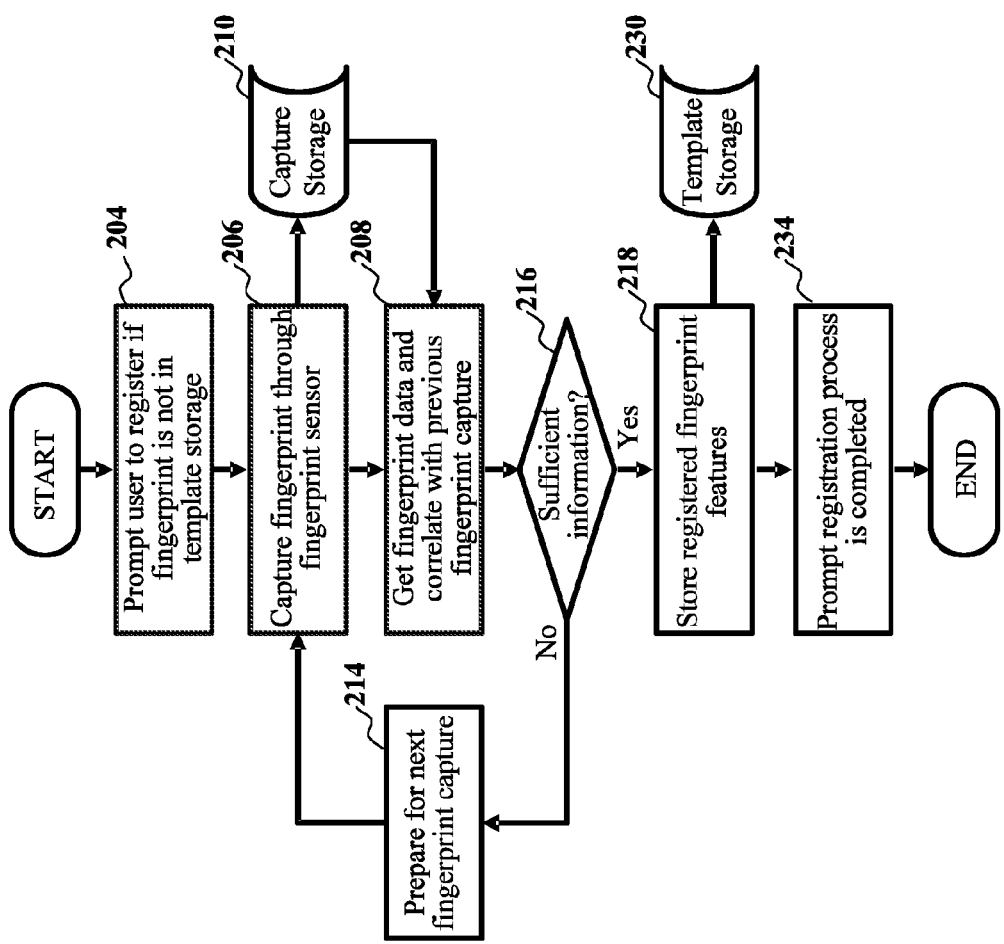
FIG. 2 is a flow chart describing an example of registration of fingerprint with reference to FIGS. 1A to 1C.

FIG. 2 is a flow chart describing an example of registration of fingerprint with reference to FIGS. 1A to 1C. In some embodiments, the fingerprint registration may be performed on an apparatus.

At 204, the apparatus may prompt user to register if fingerprint is not in template storage. In some embodiments, the apparatus may present a user interface similar to the one shown in FIG. 1A in order to prompt user to register fingerprint.

At 206, the apparatus may capture fingerprint through fingerprint sensor. The captured fingerprint data may be stored into a capture storage 210.

At 208, the apparatus may get the captured fingerprint data and correlate the fingerprint data with previous fingerprint capture from the capture storage 210.

At 216, the apparatus may determine whether sufficient information about the fingerprint is obtained. If sufficient information is obtained, the apparatus may proceed to 218. If sufficient information has not been obtained, the apparatus may proceed to 214.

At 214, the apparatus may prepare for next fingerprint capture. The apparatus may then loop back to 206 to capture fingerprint. In some embodiments, the apparatus may present a user interface similar to the one shown in FIG. 1B during the operations at 206-216.

At 218, the apparatus may store registered fingerprint features into a template storage 230. At 234, the apparatus may prompt user that registration process is complete. In some embodiments, the apparatus may present a user interface similar to the one shown in FIG. 1C.

Figure 3:
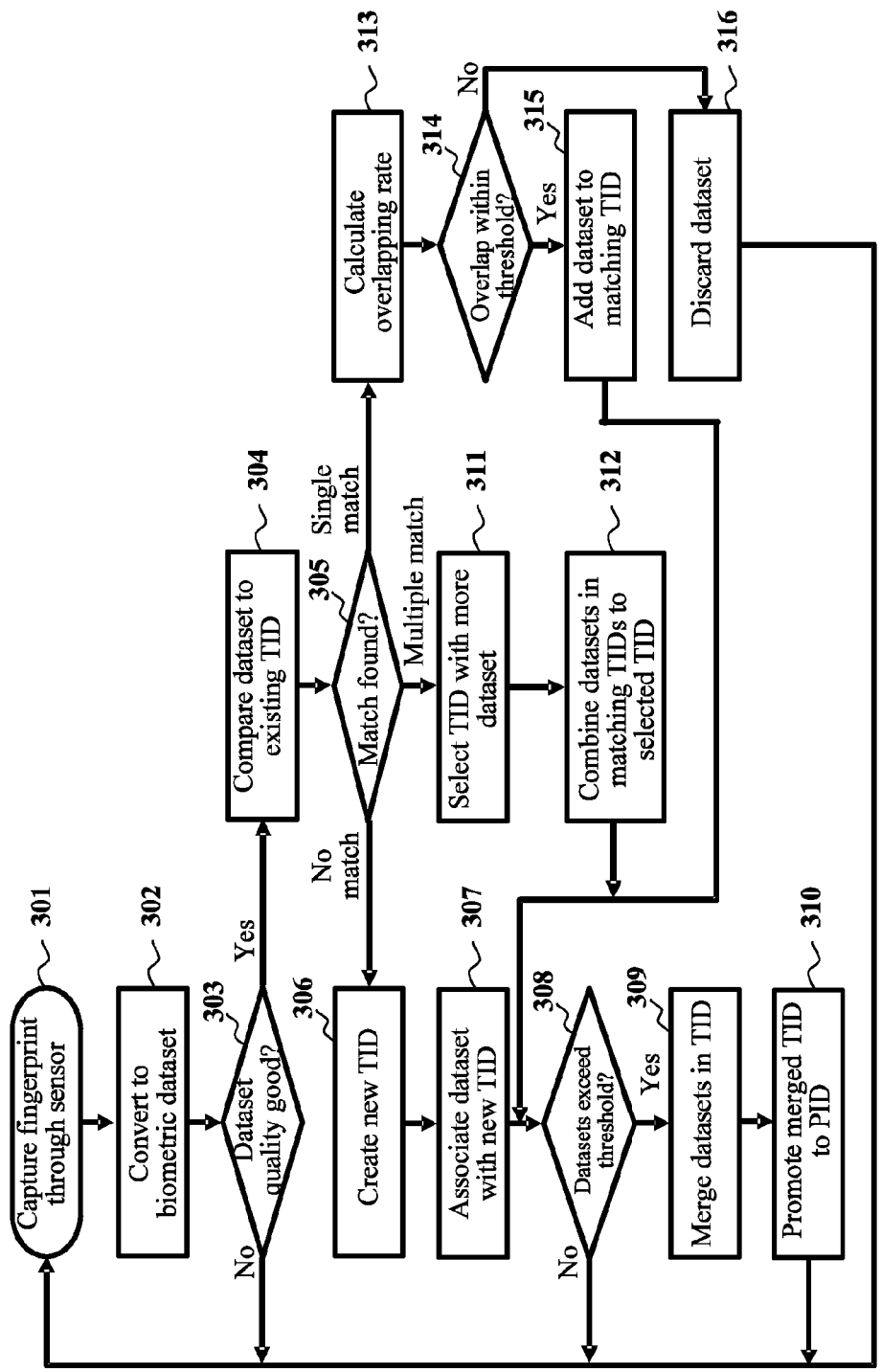
FIG. 3 is a flowchart of a method of identifying a user and creating pseudo-identity of the user without registration process, when the user is consuming the content and services from media devices.

FIG. 3 is a flowchart of a method of identifying a user and creating pseudo-identity of the user without registration process, when the user is consuming the content and services from media devices. In some embodiments, fingerprint sensor mounted on handheld device such as remote control device or smart devices may be used as sensor technology. In one embodiment, a smartphone may be used as a remote control device. The smartphone may include a fingerprint sensor that captures fingerprint data. In another embodiment, facial or iris recognition sensor mounted on console or handheld device may be used as sensor technology. In yet another embodiment, a microphone embedded in the handheld device for voice signature may be used as sensor technology. In some embodiments, operations of the method may be performed by an apparatus (e.g., apparatus 1302 or 1302' described below with reference to FIGS. 13 and 14, respectively).

Miniaturization is a desirable trait for a fingerprint sensor, because aside from the cost reduction, the smaller a sensor, the easier it is to embed such sensors in common devices such as laptop computers, smart devices, remote control or secure appliances such a door lock, padlock, or storage media like thumb drives. In some embodiments, capacitive touch sensor with sensing area 6 mm×6 mm and effective resolution 120×120 pixels may be integrated on remote control device. The method described in FIG. 3 may be iterative and may repeat as long as the user is using the device while consuming content services from media devices.

At 301, fingerprint image may be captured through fingerprint sensor. At 302, incoming fingerprint images may be electronically processed to provide a skeleton image of ridgelines and minutiae points constituted by ridge endings and bifurcations with spatial positions of the minutiae points and a reference for each minutiae point being recorded as biometric dataset in a storage medium. Techniques for minutiae extraction from a fingerprint image are well known in the art and will therefore not be discussed here.

A significant percentage of fingerprint images captured may be of poor quality, due to non-ideal skin conditions and inherently low-quality fingers, for example wet fingerprint, fingerprint with many cuts or image with partially or completely blank due to finger is not placed correctly to cover the sensor. Biometric dataset with poor quality may contain little useful minutia points. At 303, the apparatus may determine whether the quality of biometric dataset is good. If the quality of biometric dataset is good, the apparatus may proceed to 304. If the quality of biometric dataset is poor, the apparatus may discard the biometric dataset and loop back to 301.

At 304, the good dataset is compared against all previously captured datasets. At 305, the apparatus determines whether the dataset matches any previously captured datasets. If the dataset matches a previously captured dataset, the dataset is deemed to be matching the TID associated with the previously captured dataset. If the dataset matches a single TID, the apparatus may proceed to 313. If the dataset matches multiple TIDs, the apparatus may proceed to 311. If the dataset does not match any existing TID, the apparatus may proceed to 306.

In the very first iteration, only one good dataset has been captured, and therefore the operation at 304 (which will be described in detail later) does not apply. In such a case, after the dataset is determined (at 303) to have good quality, the apparatus may proceed directly to 306.

At 306, the apparatus may determine to create a temporary pseudo-identity (TID). At 307, the apparatus may associate the biometric dataset with the new TID.

At 308, the apparatus may determine whether the number of datasets associated with the TID exceeds a predetermined threshold value. If the number of datasets associated with the TID exceeds the predetermined threshold value, the apparatus may proceed to 309. If the number of datasets associated with the TID does not exceed the predetermined threshold value, the apparatus may loop back to 301.

In some embodiments, the threshold value maybe a value selected from the range of 6 to 20. The threshold value may be determined empirically based on test data. For example, a threshold value of 6 may promote and assign the particular TID that is associated with a particular finger of the user to be a pseudo-identity (PID) in a shorter time duration in using handheld device integrated with sensor. The drawback of using a lower threshold value of 6 is the lesser accuracy, which is related to inherently small sensor size. A higher threshold value of 20 or larger may give better accuracy in associating a particular finger of the user, since the datasets are accumulated over a longer time period of using handheld device integrated with sensor to consume content services from media devices.

At step 309, the datasets in the TID may be merged to discard redundancies or duplicates to reduce data size in storage. The operations at 309 may be optional as the unmerged datasets in the TID may be used in subsequent comparison.

At 310, the TID is promoted to PID. In some embodiments, the first PID may be assigned as PID1. In subsequent iterations, the next promoted TID may be numbered in an increasing order, for example PID2, PID3, PID4, and so forth.

The small sensor, combined with the user's improper placement of his/her finger on the sensor, results in a small number of minutiae in the overlapping area. It is desirable in this method to increase the finger coverage to determine if two fingerprints are from the same finger. In subsequent iterations, the capturing and converting of minutiae points into biometric datasets are repeated as described above to produce a dataset that matches to one or more existing TID, as determined at 305.

Figure 4C:
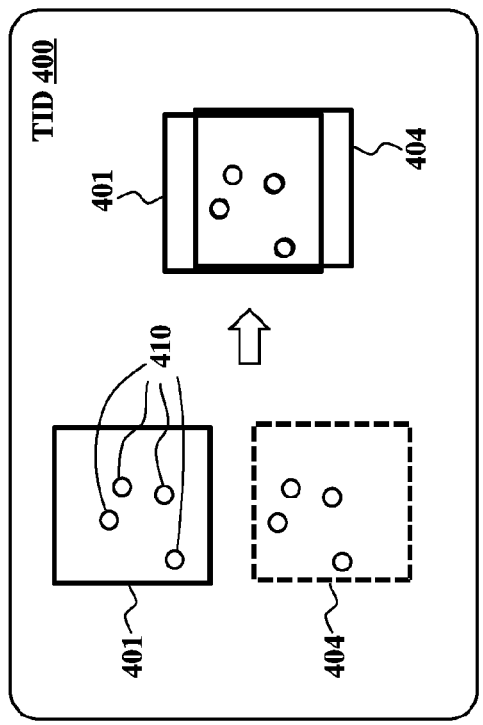
FIGS. 4A-4C show examples of operations when a newly available biometric dataset matches a single temporary pseudo-identity.
Figure 4A:
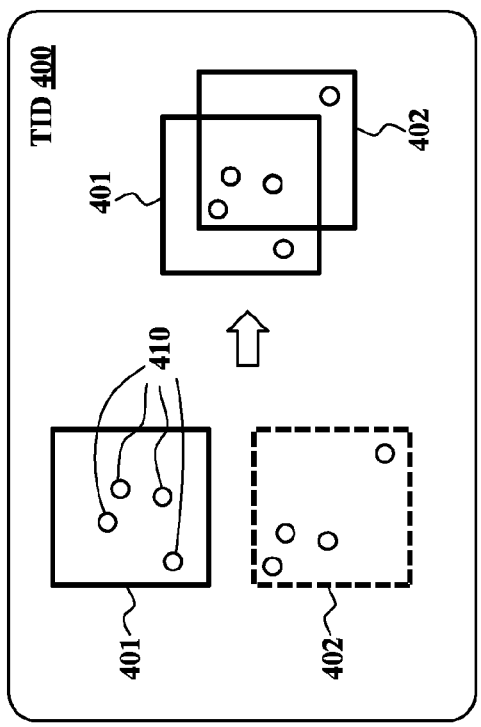
Figure 4B:
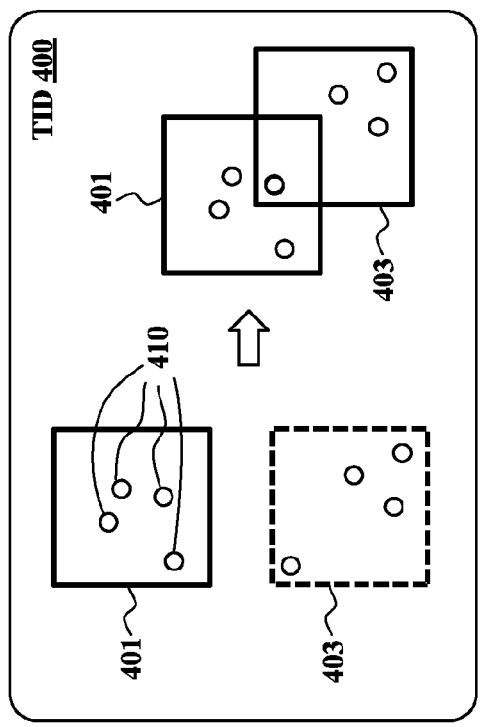

FIGS. 4A-4C show examples of operations when a newly available biometric dataset matches a single temporary pseudo-identity 400. The TID 400 is associated with a biometric dataset 401 with minutiae points 410 extracted from a previous fingerprint. Each of newly available biometric datasets 402, 403, 404 matches the biometric dataset 401, thus having a single match with TID 400, as shown in FIGS. 4A, 4B, 4C, respectively.

Referring back to FIG. 3, at 313, as the result of finding a single match, the apparatus may determine the overlapping rate between the matching biometric datasets (e.g., the biometric datasets 401 and 402). The overlapping rate is calculated as the percentage of matching biometric points over total points. In the example in FIG. 4A, the overlapping between the biometric datasets 401 and 402 is 60% (i.e., 3 out of 5).

At 314, the overlapping rate is compared with predetermined threshold. In some embodiments, if the overlapping rate is within a threshold range, the apparatus may proceed to 315. If the overlapping rate is not within the threshold range, the apparatus may proceed to 316.

The threshold range may be determined empirically based on test data. In one embodiment, overlapping rate between 20% and 80% may be accepted for the apparatus to add (at 315) newly available dataset (e.g., the biometric dataset 402 in FIG. 4A) to the matching TID (e.g., the TID 400). The apparatus may then determine (at 308) whether the number of datasets in TID 400 exceeds a predetermined threshold, as described above.

If the overlapping rate between a newly available dataset (e.g., the biometric dataset 403 in FIG. 4B) and the matching dataset (e.g., the biometric dataset 401) is less than 20% (for example 1 out of 7 as shown in FIG. 4B), the newly available dataset (e.g., the biometric dataset 403) may be discarded (at 316) to reduce data size since the newly available dataset does not offer high confidence level in ensuring dataset is from the same finger to increase finger coverage. If the overlapping rate between the newly available dataset (e.g., the biometric dataset 404 in FIG. 4C) and the matching dataset (e.g., the biometric dataset 401) is more than 80%, (for example 4 out of 4 as shown in FIG. 4C), the newly available dataset (e.g., the biometric dataset 404) may be discarded (at 316) to reduce data size since the newly available dataset does not offer more useful information to increase finger coverage. This may happen when user has placed finger at the same or very similar position multiple times.

Figure 5:
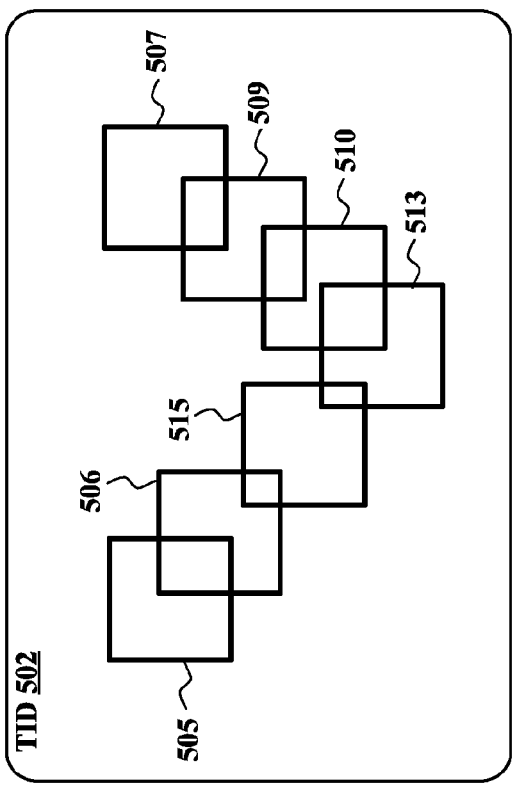
FIG. 5 illustrates an example of operations when a newly available dataset matches with multiple temporary pseudo-identities.
Figure 5:
Figure 5:
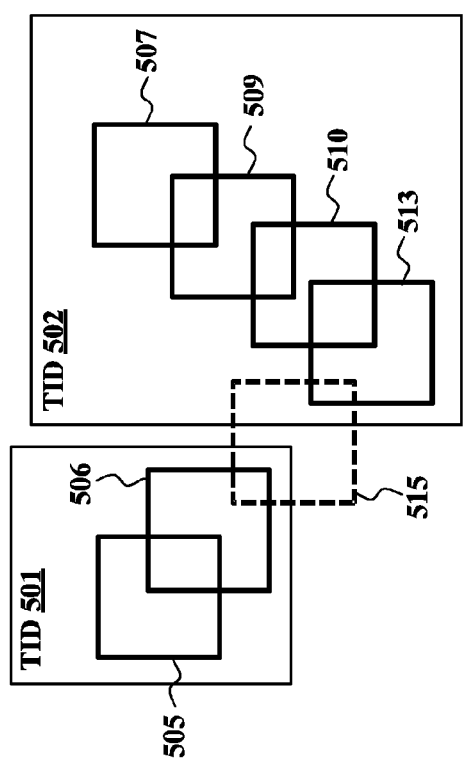

FIG. 5 illustrates an example of operations when a newly available dataset matches with multiple temporary pseudo-identities. In one embodiment, user may place the left side of a finger on sensor multiple times and a few datasets (e.g., biometric datasets 505, 506) has been successfully created to be associated with a TID (for example TID 501). User may later place the same finger but more towards the right side of the finger on sensor multiple times. This may cause another TID (for example TID 502) to be created, even though the datasets are from the same finger. This issue may be overcome by determining (at 305 in FIG. 3) if any newly available dataset has multiple matches. Multiple matches may be detected when the user has eventually placed the same finger at a position that overlaps images of both the left and right side of finger. For example, biometric dataset 515 overlaps biometric datasets 506 and 513 in FIG. 5. TID 501 is associated with two biometric datasets 505 and 506, whereas TID 502 is associated with four datasets: 507, 509, 510, and 513.

Referring back to FIG. 3, at 311, the TID with more datasets (e.g., TID 502 in FIG. 5) may be selected. At 312, the apparatus may combine datasets of the multiple matching TIDs (e.g., the TIDs 501 and 502) into the selected TID (e.g., the TID 502) and remove the other TIDs (e.g., the TID 501). The apparatus may then determine (at 308) whether the number of datasets associated with the combined TID (e.g., the TID 502) exceeds the predetermined threshold; and promotes (at 310) the TID to PID when the number of datasets associated with the combined TID exceeds the threshold.

As mentioned above, this disclosure describes method and apparatus for identifying a user by leveraging sensors integrated with a remote control device or connected to a media device and creating pseudo-identity (PID) of a user when the user is consuming the content and services from media devices. When a pseudo-identity is created, user's content preference (e.g. view history, search history, purchase history, preferred channel, types of program interested in, etc.), user's viewing habit (e.g., particular time of day, number of hours, resolution preference, volume level, etc.), and user's viewing behavior with respect to the content (e.g., fast-forward through portions, rewind, or pause portions, etc.) are associated with the PID. In subsequent usage, personalized services such as personalized guide and programs, user-selected preferences, targeted advertisement, or content and services recommendation, may be provided by service provider to user in a subtle and natural manner, without user even need to enroll or register him/herself beforehand. With pseudo-identity associated with user gets transmitted, user may not need to provide personal identification information, thus may inhibit the ability of malicious parties from causing physical, economic, and emotional harm to the individual.

Figure 6:
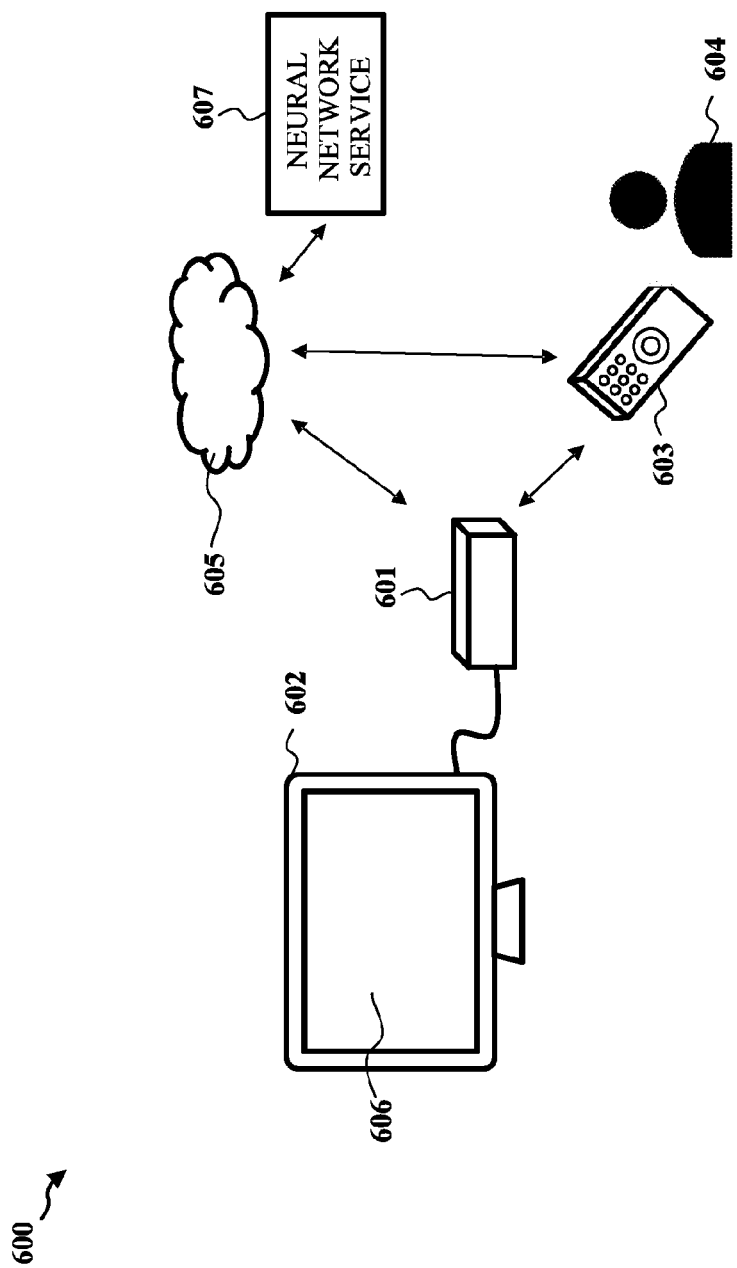
FIG. 6 is a diagram illustrating an example system for identification of a user for personalized content and services, without enrolment process.

In some embodiments, the operations performed in the disclosure may be described in the context of a personalized media consumption. FIG. 6 is a diagram illustrating an example system 600 for identification of a user for personalized content and services, without enrolment process. As shown, a media device 601, e.g., streaming media device, set top box, etc., is operatively connected to a content presentation device 602. The media device 601 and the content presentation device 602 may be consolidated into a single device, e.g., a smart TV. A remote control device 603 may take the form of handheld device such as a radio frequency remote control, smart phone, or tablet computing device. The remote control device 603 may include one or more sensors for capturing biometric information of a user 604. The remote control device 603 may communicate information and data to other systems such as the media device 601 and the content presentation device 602 via a cloud service 605 hosted in the cloud. This may allow additional processing to be applied by the cloud service 605 whereas remote control device 603 simply acts to collect data needed to identify user but lacks processing power to process the data locally. A neural network service 607 (which will be described in detail later) may be implemented via the cloud service 605. The content presentation device 602 may display a user interface dashboard 606 for user 604 to navigate, browse, and consume content offered by service provider via the media device 601. The content may include premium channels, broadcast programming, and Internet-based matter. The content may include, e.g., news, sports, weather, business, shopping, traffic, stocks, etc., and may provide a range of content types or genres, such as health and fitness, documentaries, comedy, science fiction, action/adventure, horror, romance, drama, etc.

Figure 7:
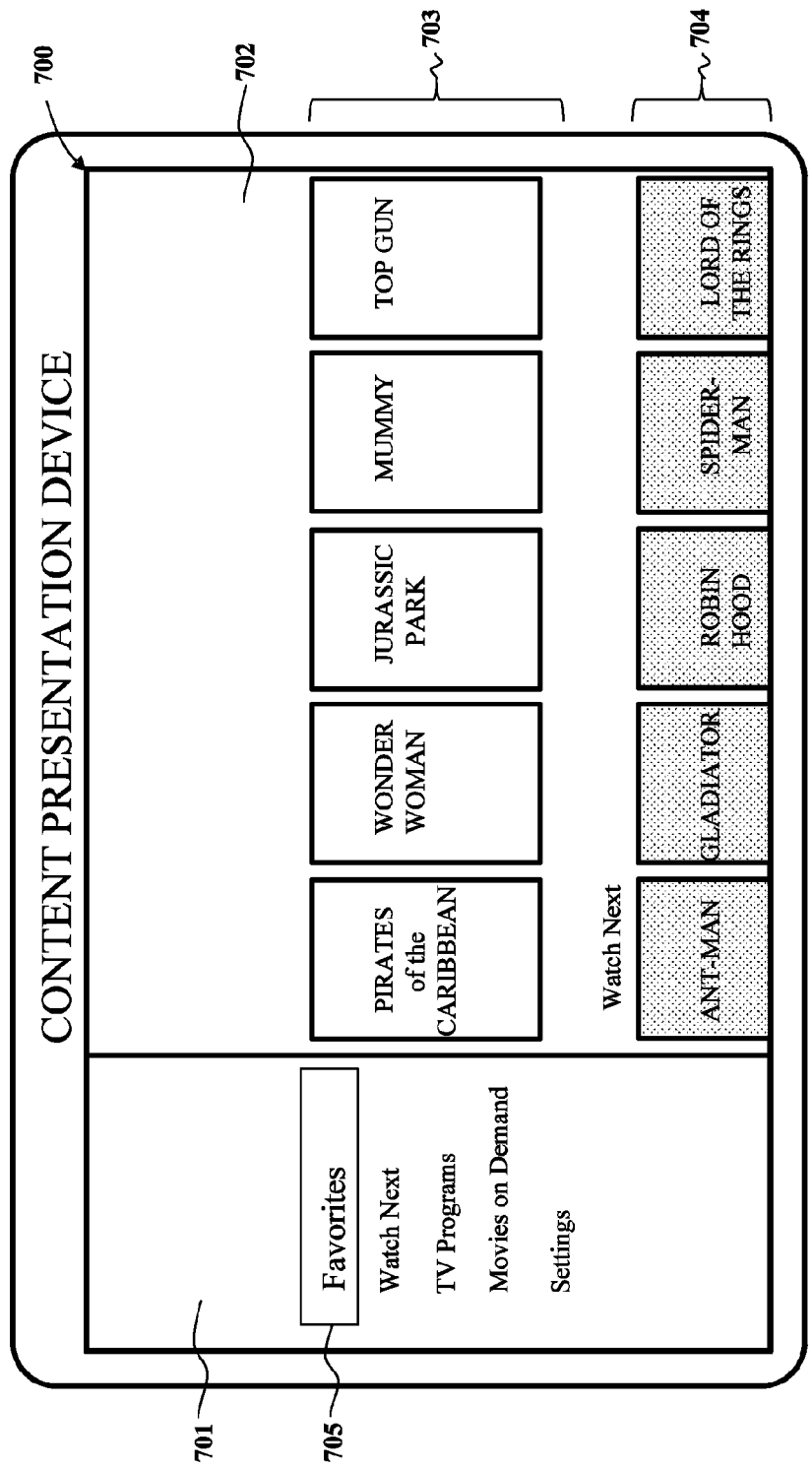
FIG. 7 is a diagram illustrating an example of user interface dashboard.

FIG. 7 is a diagram illustrating an example of user interface dashboard 700. In some embodiments, the user interface dashboard 700 may be the user interface dashboard 606 described above with reference to FIG. 6. The user interface dashboard 700 may include a menu 701, a background window 702, a list of favorite content 703, and a list of recommended content 704. The menu 701 may include selections to manage the content and device settings, for example "Favorites" 705, "Watch Next", "TV Programs", "Movies on Demand" and "Settings". The options provided by the user interface dashboard 700 may be selected via navigation keys (e.g. up/down, left/right arrow keys, 'select' key, etc.) provided on the remote control device (e.g., the remote control device 603 described above with reference to FIG. 6).

In one embodiment, a fingerprint sensor may be integrated into the 'select' key in the remote control device. Fingerprint image may be captured when user presses on the 'select' key by placing finger on the fingerprint sensor integrated in the 'select' key, and biometric information may be captured and extracted to generate pseudo-identities, as described above with reference to the flowchart in FIG. 3. The operations described above with reference to FIG. 3 may be executed completely in one or more of a remote control device (e.g., the remote control device 603), a media device (e.g., the media device 601), or a cloud service (e.g., the cloud service 605).

In some embodiments, the option selected via navigation keys on the remote control may be highlighted in response to user's selection (e.g., Favorites 705). Service provider may provide default setting and content if no identity information about the user is known. The list of content in 703 and 704 in this sample user interface is of action/adventure movies genre (e.g., PIRATES OF THE CARIBBEAN, WONDER WOMAN, JURASSIC PARK, etc.). In a default setting, the content listed may be a mixture of different movie genres (e.g., comedy, drama, musical, horror, etc.), to cater for different users' preference. The background window 702 may show a picture of the first content in the list of favorite content 703 or blank screen with default color scheme (e.g., blue, black, etc.). The service provider may allow user to change background window 702 (e.g., by selecting the "Settings" option) to display customized color scheme or picture loaded into the media device by user (e.g., family photo, scenery photo, or task reminder).

Figure 8:
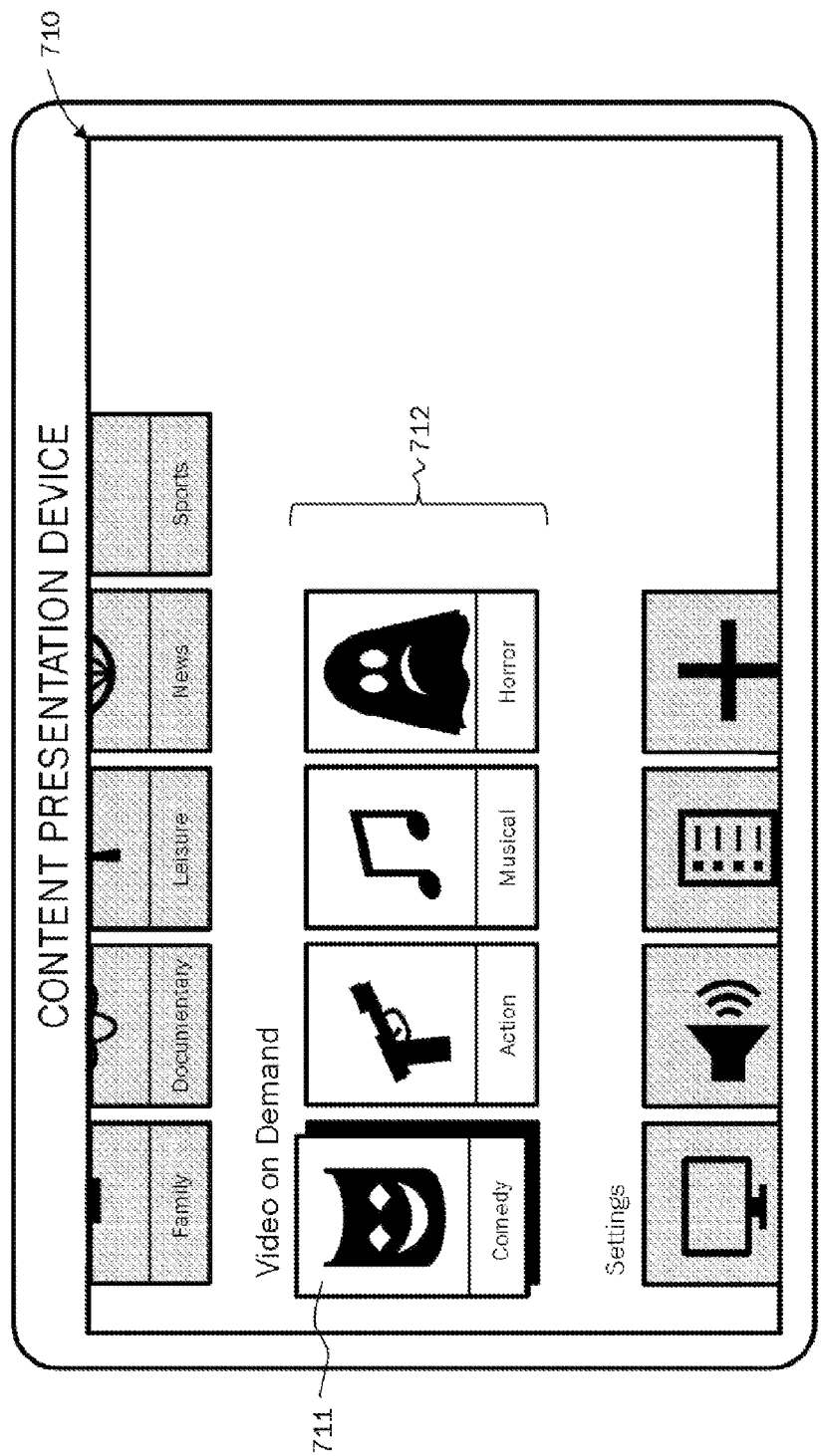
FIG. 8 is a diagram illustrating a list of movie genres presented on user interface dashboard and the "Comedy" movie genre is selected.

FIG. 8 is a diagram illustrating a list of movie genres 712 presented on user interface dashboard 710 and the "Comedy" 711 movie genre is selected. In some embodiments, the user interface dashboard 710 may be the user interface dashboard 606 described above with reference to FIG. 6. When user presses the 'select' key to confirm selection, the user interface dashboard 710 will show more choices, as shown in FIG. 9.

A user may select to play selected movie or continue to browse, select to preview synopsis or play trailer. Over a period of time, the multiple actions of pressing the 'select' key may allow the system to generate sufficient confidence to promote a selected TID to PID, e.g., as User 1. The assignment of User 1 may be made known to the service provider. The service provider may associate the PID together with many other data collected in the background to decide whether to continue with data collection and pseudo-identity assignment update, or start providing customized guide, content to user. With pseudo-identity associated with user gets transmitted in the cloud, user may not need to provide personal identification information, thus may inhibit the ability of malicious parties from causing physical, economic, and emotional harm to the individual.

Figure 9:
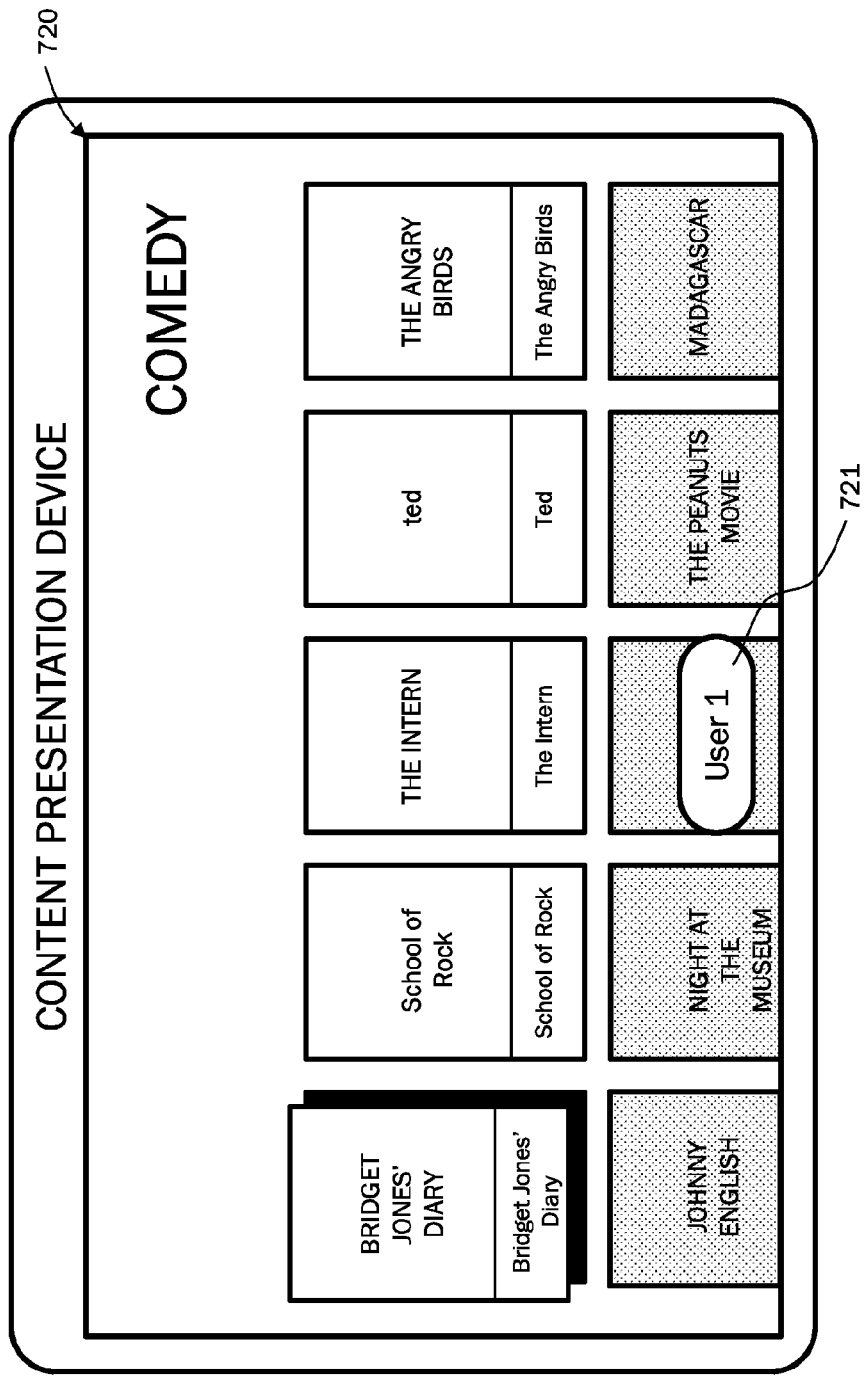
FIG. 9 shows a notification is prompted on user interface dashboard to illustrate that a pseudo-identity is created to allow service provider to provide customized content without having the user to go through the enrolment process.

FIG. 9 shows a notification 721 is prompted on user interface dashboard 720 to illustrate that a pseudo-identity is created to allow service provider to provide customized content without having the user to go through the enrolment process. In practical application, the notification 721 may be subtle and may not be made known to the user.

Figure 10:
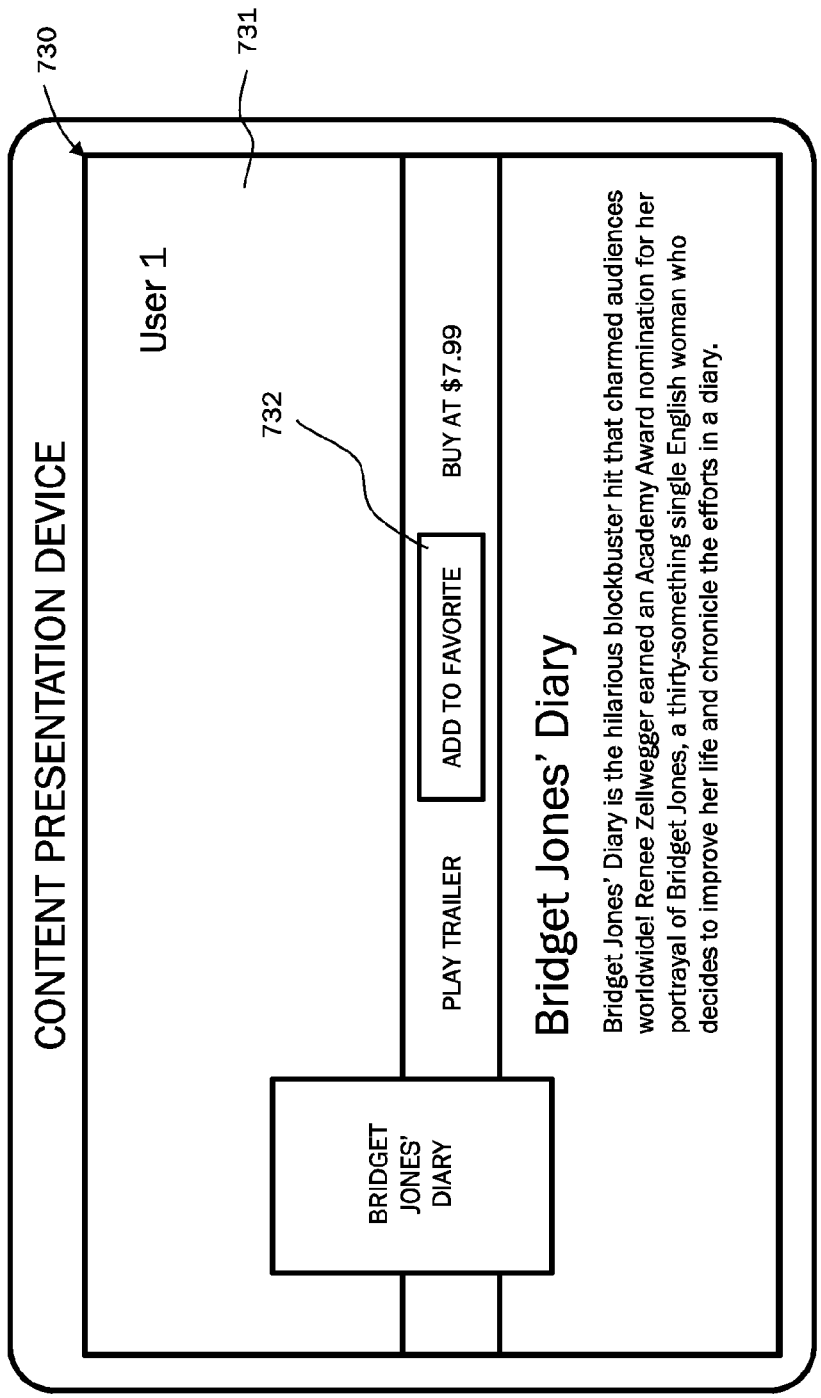
FIGS. 10 and 11 illustrate user interface dashboards showing customized setting for a user being assigned with pseudo-identity "User 1".
Figure 11:
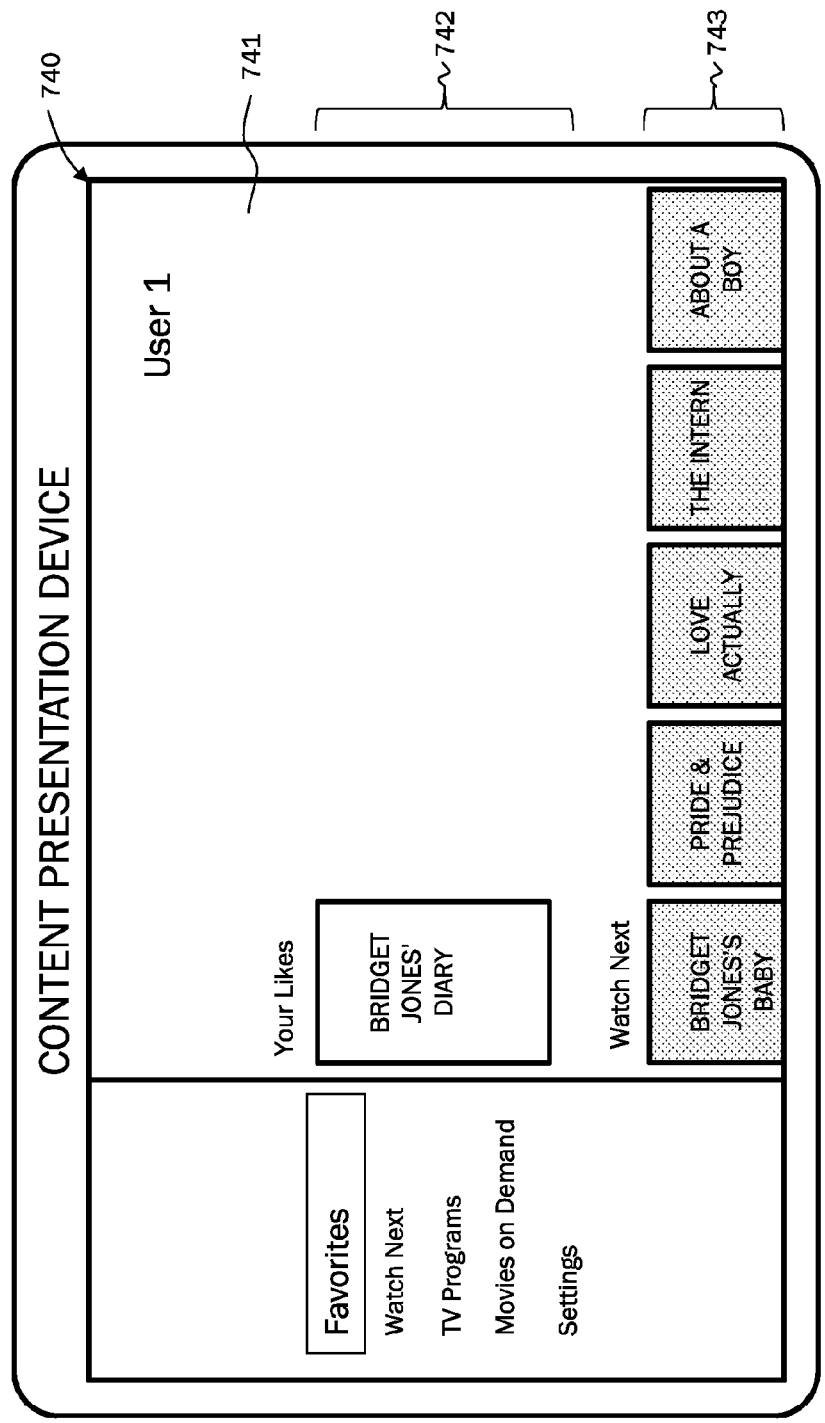

FIGS. 10 and 11 illustrate user interface dashboards 730 and 740 showing customized setting for a user (e.g., the user 604) being assigned with pseudo-identity "User 1". The background window 731 and 741 may display personalized picture or color scheme as preferred by the user. During browsing, the user may choose a movie to watch now or later by selecting the "ADD TO FAVORITE" choice 732. The chosen content is then shown in a list of preferred content 742, replacing the default list of content 703 shown in FIG. 7. The service provider may provide content recommendation, such as preferred content genre or preferred content providers, as shown in 743, using data collected from the user's viewing habits and viewing behavior. In this manner, the user may be able to bypass those content in which he/she has no interest.

In some embodiments, there may be more than one pseudo-identity generated for the same user, depending on the biometric sensor technology used in association with the operations described in the disclosure. As an example of fingerprint sensor integrated into remote control device, a user may use different fingers, for example left thumb and right thumb, to navigate while consuming content from the media device, generating two pseudo-identities over a time period. In another example of microphone for voice signature integrated into the remote control device, more than one pseudo-identity may be generated due to voice signature changes caused by external factors like environment and health, for example, noisy background or the user is having a cold.

Referring back to FIG. 6, a neural network service 607 may be implemented via the cloud service 605 to provide means to collect data from content (e.g. the types of program the user has interest in) and data of user's viewing habit and viewing behavior, and to associate the data with pseudo-identities of the user 604.

Figure 12:
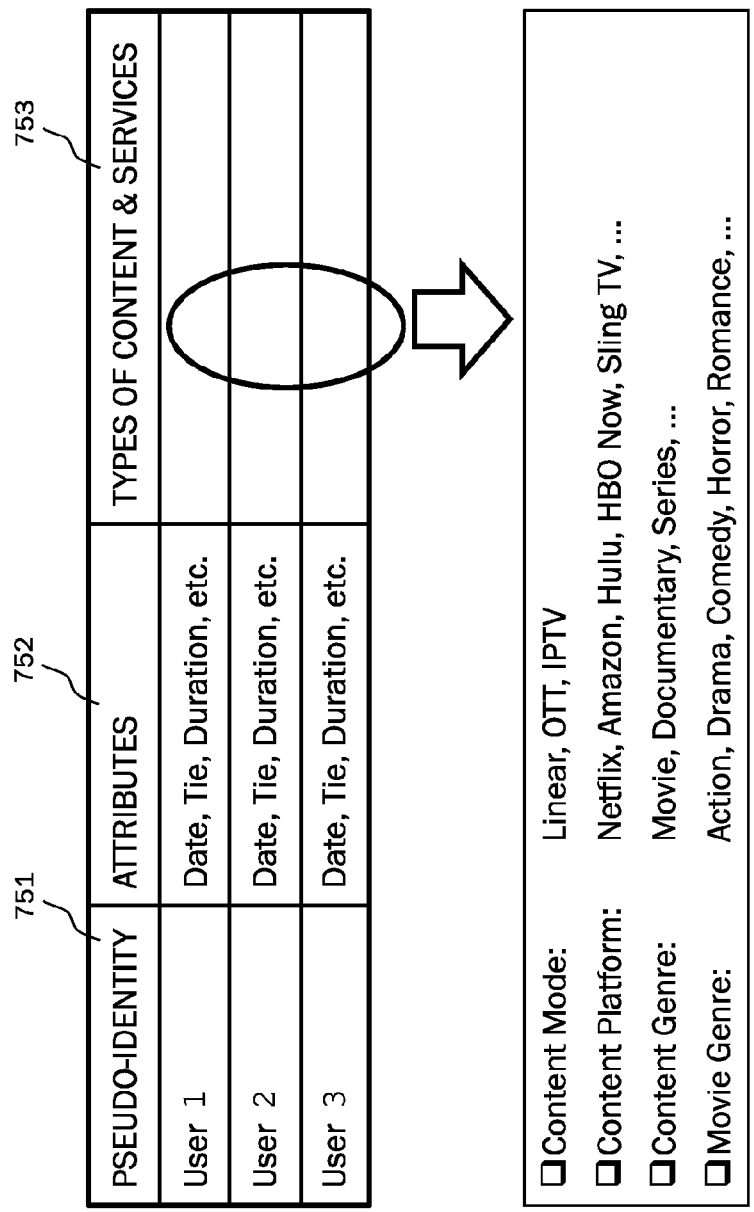
FIG. 12 illustrates a table showing how the neural network service may collect the data to further associate more than one pseudo-identity to the same user so that service provider can provide to user better personalized services such as personalized guide and programs, user-selected preferences, targeted advertisement, or content recommendation.

FIG. 12 illustrates a table showing how the neural network service 607 may collect the data to further associate more than one pseudo-identity to the same user so that service provider can provide to user better personalized services such as personalized guide and programs, user-selected preferences, targeted advertisement, or content recommendation. In some embodiments, the viewing habits of user in watching the content (e.g., particular time of day, number of hours, etc.) and viewing behaviors of user in performing a variety of functions with respect to the content (e.g., fast-forward through portions, rewind, or pause portions, etc.) may be monitored and utilized as Attributes 752, the Types of Content 753 in association with pseudo-identity 751. The pseudo-identity 751 (e.g. User 1, User 2, User 3, etc.) may be made known to the service provider by the operations described above with reference to FIG. 3. Assume that User 1 has the habit of watching Comedy movies on Netflix on Sunday late evening 8:00 p.m. for 1 to 2 hours, and User 3 has similar habit and movie genre, the neural network service 607 may assume with high confidence that User 1 and User 3 are, with high probability, the same user. The neural network service 607 may enable the service provider to target similar advertisement and content recommendation to User 1 and User 3.

While many embodiments described relate to fingerprint biometric, it will be appreciated that the method and procedure for creating pseudo-identity of a user, associating more than one pseudo-identity with content services preferred by user, viewing habit and viewing behavior of user with the content services, to allow personalized guide and content services to be provided in a subtle and natural manner, without user even needs to enroll or register him/herself beforehand, are applicable to other biometric sensors that require enrolment/registration in the traditional applications, for example, facial or iris recognition sensor, microphone for voice signature, contact or grip sensors (e.g. capacitive, mechanical, or pressure sensors) that distinguish user holding styles, or optical sensors located on peripheral edges of device to ascertain vein pattern data.

Figure 13:
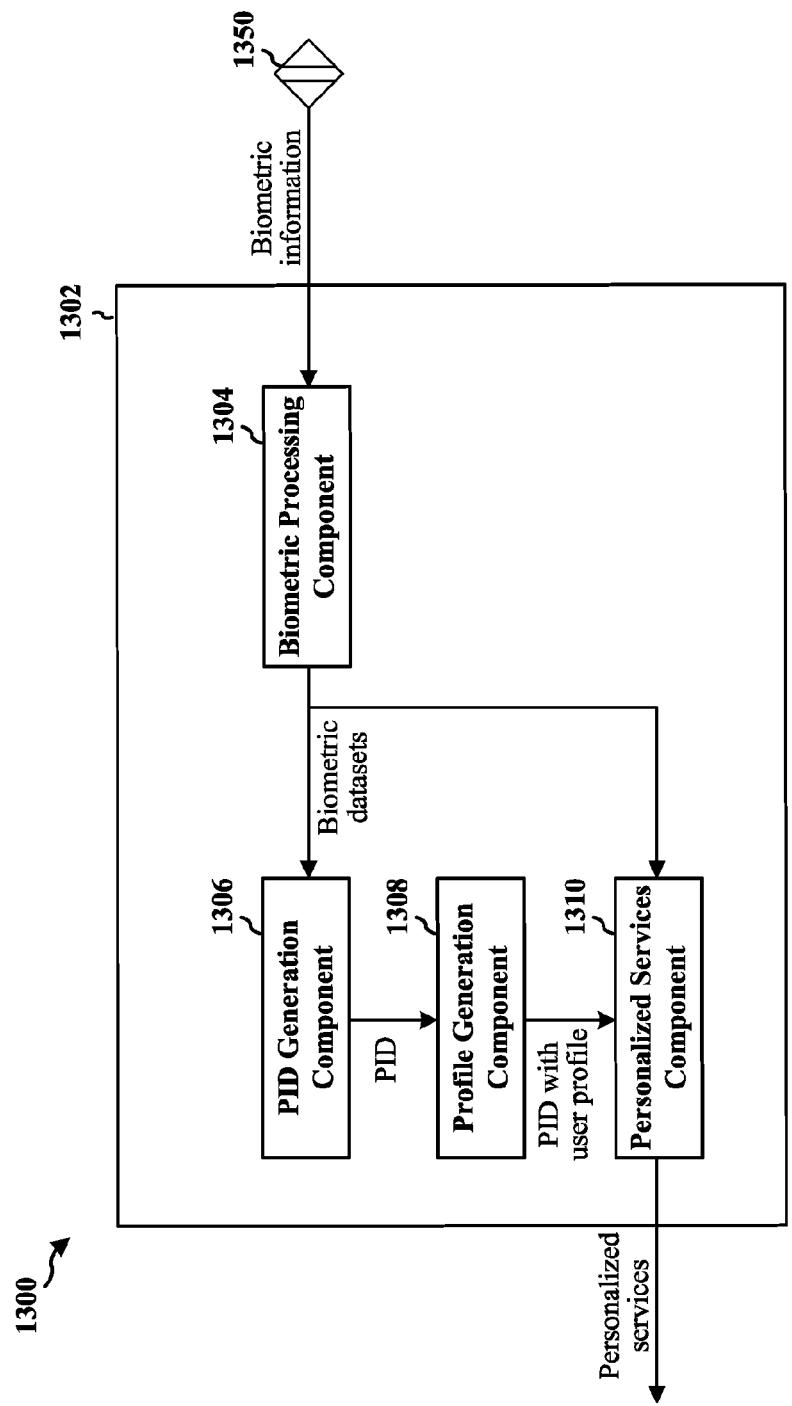
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus 1302 may include one or more of a remote control device (e.g., the remote control device 603), a media device (e.g., the media device 601), or a cloud service (e.g., the cloud service 605). The apparatus 1302 may include a biometric processing component 1304 that is configured to convert biometric information received from a set of biometric sensors 1350 into biometric datasets. In one embodiment, the biometric processing component 1304 may perform the operations described above with reference to 302 in FIG. 3. In some embodiments, the set of biometric sensors 1350 may be part of the apparatus 1302. In some embodiments, the set of biometric sensors 1350 may be separate from the apparatus 1302.

The apparatus 1302 may include a PID generation component 1306 that is configured to generate a PID based on the biometric datasets received from the biometric processing component 1304. In one embodiment, the PID generation component 1306 may perform the operations described above with reference to 304, 305, 306, 307, 308, 309, 310, 311, 312, 313, 314, 315, or 316 in FIG. 3.

The apparatus 1302 may include a profile generation component 1308 that is configured to generate a user profile to be associated with the PID. The apparatus 1302 may include a personalized services component 1310 that is configured to provide personalized services to a user based on biometric datasets of the user and the user profile associated with a matching PID.

The apparatus 1302 may include additional components that perform each of the blocks of the algorithm in the aforementioned flowchart of FIG. 3. As such, each block in the aforementioned flowchart of FIG. 3 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
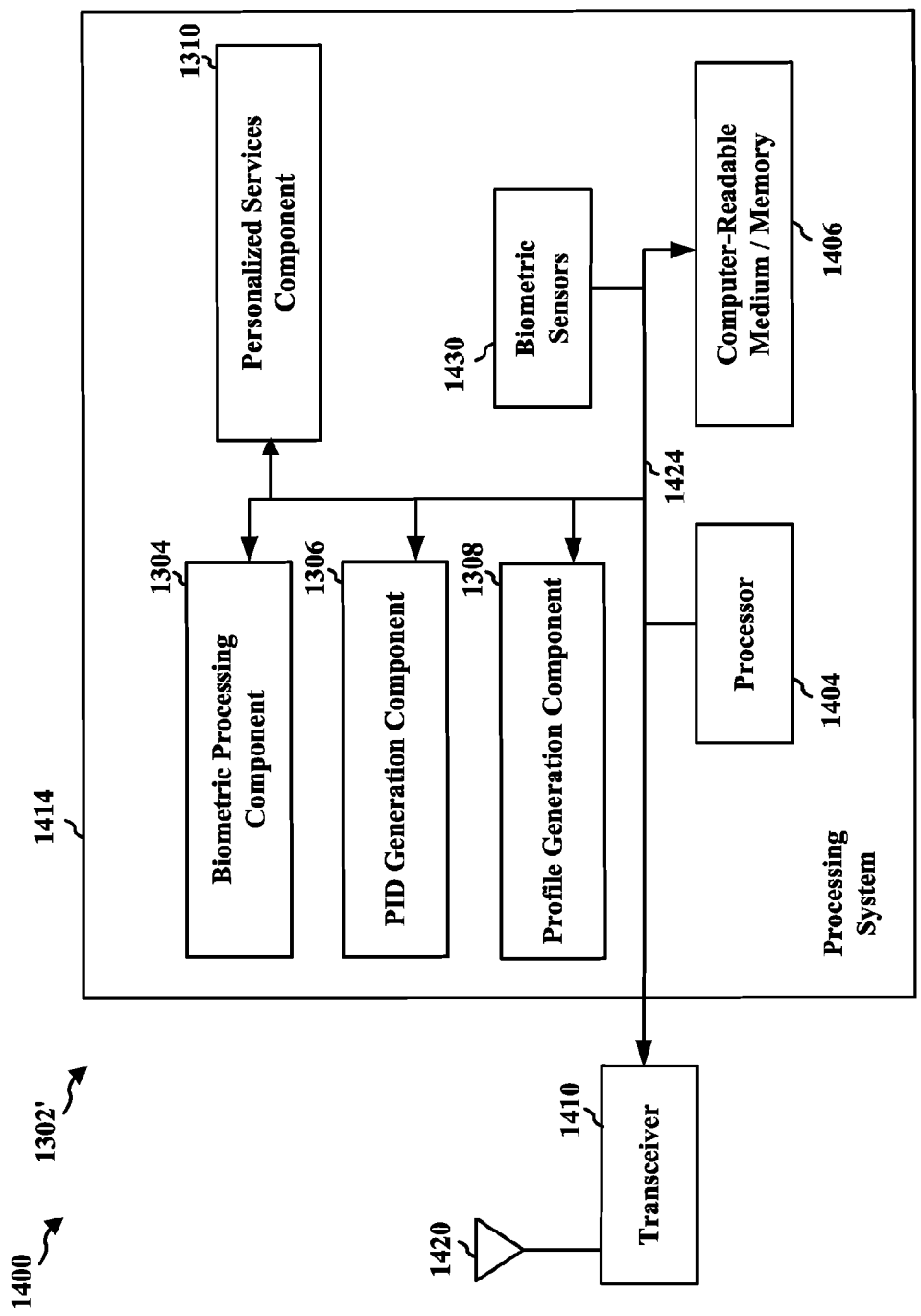
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The apparatus 1302' may be the apparatus 1302 described above with reference to FIG. 13. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, the biometric sensors 1430, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414. In addition, the transceiver 1410 receives information from the processing system 1414, and based on the received information, generates a signal to be applied to the one or more antennas 1420.

The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1308. The components may be software components running in the processor 1404, resident/stored in the computer readable medium/memory 1406, one or more hardware components coupled to the processor 1404, or some combination thereof.

In the following, various aspects of this disclosure will be illustrated:

Example 1 is a method or apparatus for user recognition. The apparatus may capture biometric information of a user using a set of biometric sensors. The apparatus may convert the biometric information of the user into a biometric dataset of the user. The apparatus may determine whether the biometric dataset matches any existing temporary pseudo-identity. The apparatus may create a temporary pseudo-identity of the user to be associated with the biometric dataset when the biometric dataset does not match any existing temporary pseudo-identity. The apparatus may determine whether the temporary pseudo-identity satisfies a set of pseudo-identity criteria. The apparatus may convert the temporary pseudo-identity of the user into a pseudo-identity of the user when the temporary pseudo-identity satisfies the set of pseudo-identity criteria.

In Example 2, the subject matter of Example 1 may optionally include that, to determine whether the biometric dataset matches any existing temporary pseudo-identity, the apparatus may determine whether the biometric dataset matches a biometric dataset associated with any existing temporary pseudo-identity.

In Example 3, the subject matter of any one of Examples 1 to 2 may optionally include that the apparatus may further determine whether the biometric dataset matches a single existing temporary pseudo-identity or a plurality of existing temporary pseudo-identities when the biometric dataset matches at least one existing temporary pseudo-identity.

In Example 4, the subject matter of Example 3 may optionally include that the apparatus may further: calculate an overlapping rate between the biometric dataset and the matching existing temporary pseudo-identity when the biometric dataset matches a single existing temporary pseudo-identity; determine whether the overlapping rate satisfies an overlapping criteria; and associate the biometric dataset with the matching existing temporary pseudo-identity when the overlapping rate satisfies the overlapping criteria.

In Example 5, the subject matter of Example 4 may optionally include that the overlapping criteria may be satisfied when the overlapping rate is within a numerical range.

In Example 6, the subject matter of any one of Examples 3 to 5 may optionally include that the apparatus may further: combine the plurality of existing temporary pseudo-identities to form a combined temporary pseudo-identity when the biometric dataset matches the plurality of existing temporary pseudo-identities; and associate the biometric dataset with the combined temporary pseudo-identity.

In Example 7, the subject matter of any one of Examples 1 to 6 may optionally include that the set of pseudo-identity criteria may be satisfied when the number of biometric datasets associated with the temporary pseudo-identity exceeds a predetermined value.

In Example 8, the subject matter of Example 7 may optionally include that the apparatus may further merge the biometric datasets associated with the temporary pseudo-identity before the temporary pseudo-identity is converted into the pseudo-identity.

In Example 9, the subject matter of any one of Examples 1 to 8 may optionally include that the apparatus may further associate a user profile with the pseudo-identity of the user.

In Example 10, the subject matter of Example 9 may optionally include that the user profile may be generated based on at least one of content preference of the user, viewing habit of the user, or viewing behavior of the user with respect to content, where the content preference of the user, the viewing habit of the user, or the viewing behavior of the user with respect to content is obtained within a threshold time period before or after the biometric information of the user is captured.

In Example 11, the subject matter of any one of Examples 9 to 10 may optionally include that the apparatus may further: capture a second biometric information of a second user using the set of biometric sensors; convert the second biometric information of the second user into a second biometric dataset; determine that the second biometric dataset matches a particular pseudo-identity; and provide personalized services to the second user based on a user profile associated with the particular pseudo-identity.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of user recognition, comprising:
capturing biometric information of a user using a fingerprint sensor without an intentional user registration, wherein the intentional user registration includes, either before the user uses the fingerprint sensor or when the fingerprint sensor fails to recognize the user, requesting the user (1) to put a finger on the fingerprint sensor to scan a fingerprint and (2) to input personal information;

converting the biometric information of the user into a biometric dataset of the user;

determining whether the biometric dataset matches a biometric dataset associated with any existing temporary pseudo-identity;

creating a temporary pseudo-identity of the user to be associated with the biometric dataset when the biometric dataset does not match a biometric dataset associated with any existing temporary pseudo-identity;

determining whether the temporary pseudo-identity satisfies a set of pseudo-identity criteria;

converting the temporary pseudo-identity of the user into a pseudo-identity of the user when the temporary pseudo-identity satisfies the set of pseudo-identity criteria; and associating a user profile with more than one pseudo-identity of the user based on the fingerprint sensor without the user providing personal identification information.

2. The method of claim 1, further comprising:
determining whether the biometric dataset matches a single existing temporary pseudo-identity or a plurality of existing temporary pseudo-identities when the biometric dataset matches at least one existing temporary pseudo-identity.

3. The method of claim 2, further comprising:
calculating an overlapping rate between the biometric dataset and the matching existing temporary pseudo-identity when the biometric dataset matches a single existing temporary pseudo-identity;
determining whether the overlapping rate satisfies an overlapping criteria; and
associating the biometric dataset with the matching existing temporary pseudo-identity when the overlapping rate satisfies the overlapping criteria.

4. The method of claim 3, wherein the overlapping criteria is satisfied when the overlapping rate is within a numerical range.

5. The method of claim 2, further comprising:
combining the plurality of existing temporary pseudo-identities to form a combined temporary pseudo-identity when the biometric dataset matches the plurality of existing temporary pseudo-identities; and
associating the biometric dataset with the combined temporary pseudo-identity.

6. The method of claim 1, wherein the set of pseudo-identity criteria is satisfied when a number of biometric datasets associated with the temporary pseudo-identity exceeds a predetermined value.

7. The method of claim 6, further comprising:
merging biometric datasets associated with the temporary pseudo-identity before the temporary pseudo-identity is converted into the pseudo-identity.

8. The method of claim 1, wherein the user profile is generated based on at least one of content preference of the user, viewing habit of the user, or viewing behavior of the user with respect to content, wherein the content preference of the user, the viewing habit of the user, or the viewing behavior of the user with respect to content is obtained within a threshold time period before or after the biometric information of the user is captured.

9. The method of claim 1, further comprising:
capturing a second biometric information of a second user using the fingerprint sensor;
converting the second biometric information of the second user into a second biometric dataset;
determining that the second biometric dataset matches a particular pseudo-identity; and
providing personalized services to the second user based on a user profile associated with the particular pseudo-identity.

10. An apparatus for user recognition, the apparatus comprising:
a fingerprint sensor configured to capture biometric information of a user without an intentional user registration,
wherein the intentional user registration includes, either before the user uses the fingerprint sensor or when the fingerprint sensor fails to recognize the user, requesting the user (1) to put a finger on the fingerprint sensor to scan a fingerprint and (2) to input personal information; and at least one processor configured to:
convert the biometric information of the user into a biometric dataset of the user;
determine whether the biometric dataset matches a biometric dataset associated with any existing temporary pseudo-identity;
create a temporary pseudo-identity of the user to be associated with the biometric dataset when the biometric dataset does not match a biometric dataset associated with any existing temporary pseudo-identity;
determine whether the temporary pseudo-identity satisfies a set of pseudo-identity criteria;
convert the temporary pseudo-identity of the user into a pseudo-identity of the user when the temporary pseudo-identity satisfies the set of pseudo-identity criteria; and
associate a user profile with more than one pseudo-identity of the user based on the fingerprint sensor without the user providing personal identification information.

11. The apparatus of claim 10, wherein the at least one processor is further configured to:
determine whether the biometric dataset matches a single existing temporary pseudo-identity or a plurality of existing temporary pseudo-identities when the biometric dataset matches at least one existing temporary pseudo-identity.

12. The apparatus of claim 11, wherein the at least one processor is further configured to:
calculate an overlapping rate between the biometric dataset and the matching existing temporary pseudo-identity when the biometric dataset matches a single existing temporary pseudo-identity;
determine whether the overlapping rate satisfies an overlapping criteria; and
associate the biometric dataset with the matching existing temporary pseudo-identity when the overlapping rate satisfies the overlapping criteria.

13. The apparatus of claim 11, wherein the at least one processor is further configured to:
combine the plurality of existing temporary pseudo-identities to form a combined temporary pseudo-identity when the biometric dataset matches the plurality of existing temporary pseudo-identities; and
associate the biometric dataset with the combined temporary pseudo-identity.

14. The apparatus of claim 10, wherein the set of pseudo-identity criteria is satisfied when a number of biometric datasets associated with the temporary pseudo-identity exceeds a predetermined value.

15. The apparatus of claim 10, wherein the user profile is generated based on at least one of content preference of the user, viewing habit of the user, or viewing behavior of the user with respect to content, wherein the content preference of the user, the viewing habit of the user, or the viewing behavior of the user with respect to content is obtained within a threshold time period before or after the biometric information of the user is captured.

16. The apparatus of claim 10, wherein the fingerprint sensor is further configured to capture a second biometric information of a second user, wherein the at least one processor is further configured to:
- convert the second biometric information of the second user into a second biometric dataset;
- determine that the second biometric dataset matches a particular pseudo-identity; and
- provide personalized services to the second user based on a user profile associated with the particular pseudo-identity.

\* \* \* \* \*